United States Patent [19]
Takeda et al.

[11] Patent Number: 5,527,087
[45] Date of Patent: Jun. 18, 1996

[54] VEHICLE SEAT APPARATUS INCLUDING A LOCKING MECHANISM

[75] Inventors: Nobuhiko Takeda, Obu; Yasuhiro Kojima, Chiryu, both of Japan

[73] Assignee: Aisin Seiki Kabushiki Kaisha, Kariya, Japan

[21] Appl. No.: 330,527

[22] Filed: Oct. 28, 1994

[30] Foreign Application Priority Data

Oct. 28, 1993 [JP] Japan ..................................... 5-271037
Nov. 24, 1993 [JP] Japan ..................................... 5-293195

[51] Int. Cl.$^6$ ..................................................... B60N 2/32
[52] U.S. Cl. .................... 297/15; 297/378.12; 297/463.1
[58] Field of Search ................................. 297/15, 378.12, 297/14, 369, 368, 367, 366, 378.1, 463.1; 296/65.1

[56] References Cited

U.S. PATENT DOCUMENTS

| | | | |
|---|---|---|---|
| 2,926,948 | 3/1960 | Koplin et al. | 297/378.12 X |
| 3,398,987 | 8/1968 | Lynn et al. | 297/367 X |
| 4,461,511 | 7/1984 | Berneking et al. | 297/378.12 X |
| 4,805,953 | 2/1989 | Yamauchi | 297/378.1 X |
| 5,195,795 | 3/1993 | Cannera et al. | 297/15 X |
| 5,328,243 | 7/1994 | Akiyama | 297/378.12 |

FOREIGN PATENT DOCUMENTS

| | | | |
|---|---|---|---|
| 3205117 | 8/1983 | Germany | 297/378.12 |
| 3-18273 | 4/1991 | Japan . | |

*Primary Examiner*—Milton Nelson, Jr.
*Attorney, Agent, or Firm*—Finnegan, Henderson, Farabow, Garrett & Dunner

[57] ABSTRACT

A seat apparatus for a vehicle includes a first bracket having an upper end and a lower end pivoted to a floor of the vehicle, a second bracket located behind the first bracket along the vehicle lengthwise direction and having an upper end and a lower end pivoted to the floor of the vehicle, a seat-cushion having a front end pivoted to the upper end of the first bracket and a rear end connected to the upper end of the second bracket so as to be movable relative thereto, a seat-back having a lower end connected fixedly to the upper end of the second bracket and making a reclining angle relative to the seat-cushion, a locking mechanism having a locking condition in which the reclining angle is held and an unlocking position in which the seat-back is rotatable relative to the seat-cushion, and an operating device for establishing the unlocking condition of the locking mechanism in concurrence with a rotation of the seat-back toward the seat-cushion in a vehicle frontward direction movement.

3 Claims, 8 Drawing Sheets

VEHICLE SEAT APPARATUS INCLUDING A LOCKING MECHANISM

BACKGROUND OF THE INVENTION

The present invention relates to a seat apparatus for a vehicle and in particular to a seat apparatus for a van-type vehicle which is set to take a use position and a non-use position.

In a Japanese Utility Model Publication No.Hei 3(1991)-18273 issued on Apr. 17, 1991 after examination, a conventional seat apparatus is disclosed. The conventional seat apparatus is a rear seat of a van-type vehicle and is located adjacent to a trunk room. This seat is transferred from its use position to a non-use position when an inner space of the trunk room of the vehicle has to be expanded or increased. In detail, the conventional seat apparatus includes a seat-cushion, a stem pivoted at upper and lower ends thereof to a front end of the seat-cushion and a floor of the vehicle, respectively, a link pivoted at upper and lower ends thereof to the floor and the seat-cushion, respectively, and a seat-back secured to the upper end of the link. When the seat apparatus is in the use position, the seat-back makes a reclining angle relative to the seat-cushion and the current position of the seat-back is locked to a stationary part of the vehicle via a locking mechanism. When bringing the seat apparatus into the non-use position under which the seat-back is in layered relationship with the seat-cushion, the locking mechanism is initially unlocked or released, and thereafter the seat-back is rotated. In concurrence with the rotation of the seat-back, the seat-cushion is brought with a folding movement toward the floor. Thus, the seat-back is in layered relationship with the seat-cushion.

However, transferring the seat apparatus from its use position to its non-use position requires a two step manual operation which consists of unlocking the seat-back from the vehicle stationary part and rotating the seat-back toward the seat-cushion. This two step operation is very cumbersome and time consuming.

SUMMARY OF THE INVENTION

It is, therefore, an object of the present invention to provide a seat apparatus for a vehicle without the foregoing drawbacks.

It is another object of the present invention to provide seat apparatus for a vehicle in which a transfer thereof from a use position to a non-use position can be established in a single action.

In order to attain the foregoing objects, a seat apparatus for a vehicle is comprised of (1) a first bracket having an upper end and a lower end pivoted to a floor of the vehicle, (2) a second bracket located behind the first bracket along the vehicle lengthwise direction and having an upper end and a lower end pivoted to the floor of the vehicle, (3) a seat-cushion having a front end pivoted to the upper end of the first bracket and a rear end connected to the upper end of the second bracket so as to be movable relative thereto, (4) a seat-back having a lower end connected fixedly to the upper end of the second bracket and making a reclining angle relative to the seat-cushion, (5) a locking mechanism having a locking condition in which the reclining angle is held and an unlocking position in which the seat-back is rotatable relative to the seat-cushion, and (6) an operating device for establishing the unlocking condition of the locking mechanism in concurrence with rotation of the seat-back toward the seat-cushion in a vehicle frontward direction movement.

BRIEF DESCRIPTION OF THE DRAWINGS

The above and other objects, features and advantages of the present invention will be more apparent and more readily appreciated from the following detailed description of preferred exemplary embodiment of the present invention, taken in connection with the accompanying drawings, in which.

DESCRIPTION OF THE PREFERRED EMBODIMENTS

Embodiments of the present invention will be described hereinunder in detail with reference to the accompanying drawings.

Figure 1:
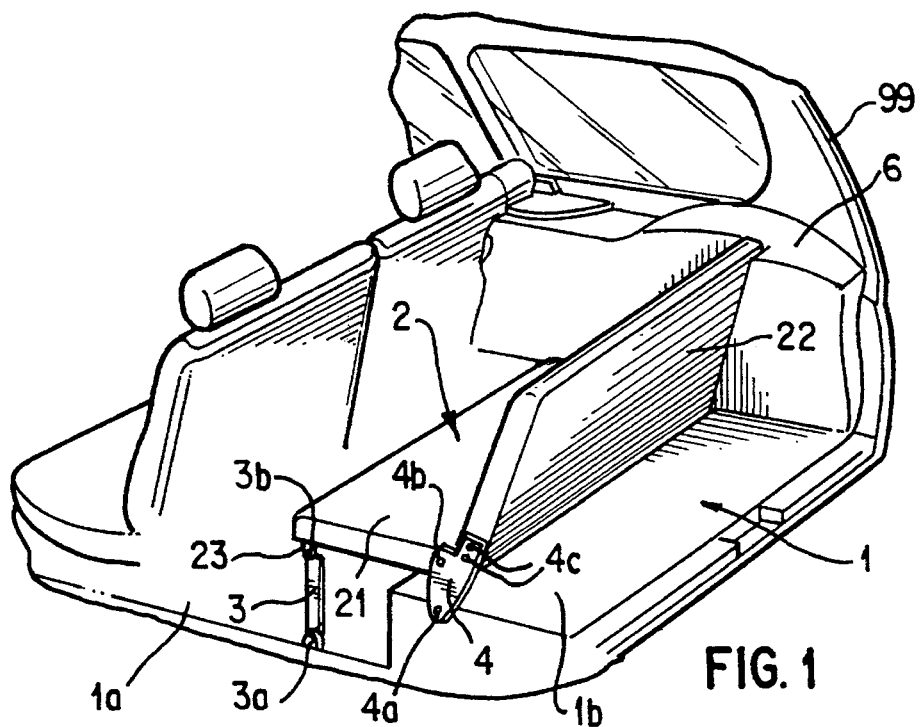
FIG. 1 is a perspective view of a seat apparatus for a vehicle in accordance with a first embodiment of the present invention wherein the seat apparatus is in a use position.

Referring to FIG. 1, a body 99 of a van-type vehicle has an inner space or trunk room which is provided with a stepped type floor 1 having a lower portion 1a and a higher portion 1b. On the floor 1, there is mounted or installed a seat apparatus 2 including a seat-cushion 21 and a seat-back 22.

Figure 2:
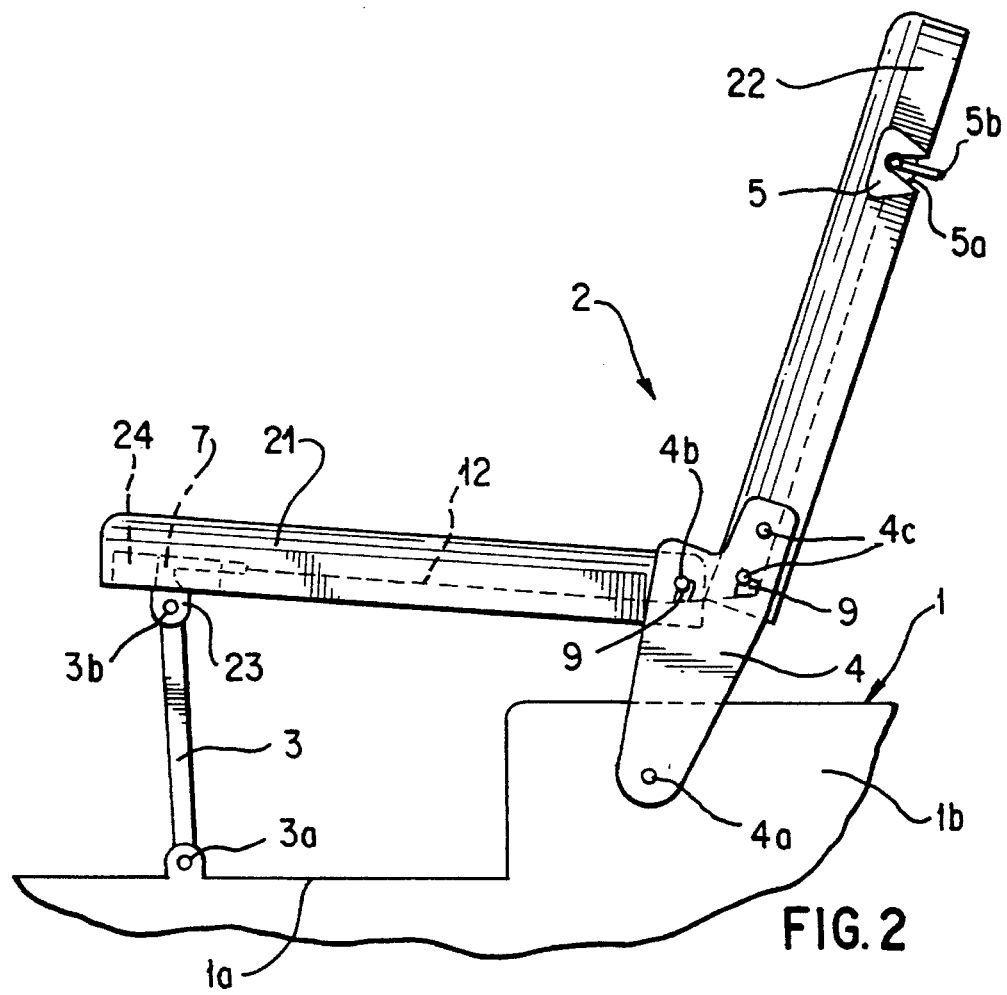
FIG. 2 is a side view of the seat apparatus shown in FIG. 1.

As shown in FIG. 2, a pair of laterally spaced stays 3 and 3 (only one is shown) are pivoted to the lower portion 1a of the floor 1 via pins 3a and 3a (only one is shown). In addition, a pair of laterally spaced links 4 and 4 (only one is shown) are pivoted to the higher portion 1b of the floor 1 via pins 4a and 4a (only one is shown). The stay 3 is pivoted to a bracket 23 secured to a lower frontward portion of the seat-cushion 21. The link 4 is supported by a pin 4b to a rear portion of a lateral side of the seat-cushion 21. The link 4 is fixedly connected to a lower end portion of the seat-back 22.

Between the seat-back 22 and the trim 6, a locking mechanism 5 is provided which includes a latch 5a rotatably connected to a rear side of the seat-back 22 and a striker 5b secured to the trim 6. The locking mechanism 5 establishes a locked condition between the seat-back 22 and the trim 6 by regulating rotation of the latch 5a while the latch 5a is in engagement with the striker 5b. The latch 5a is associated with a pawl (not shown) which is operated by a handle 7. The latch 5a is rotated by the handle 7 to permit a release of the latch 5a from the striker 5b, thereby establishing an unlocked condition between the seat-back 22 and the trim 6.

Figure 3:
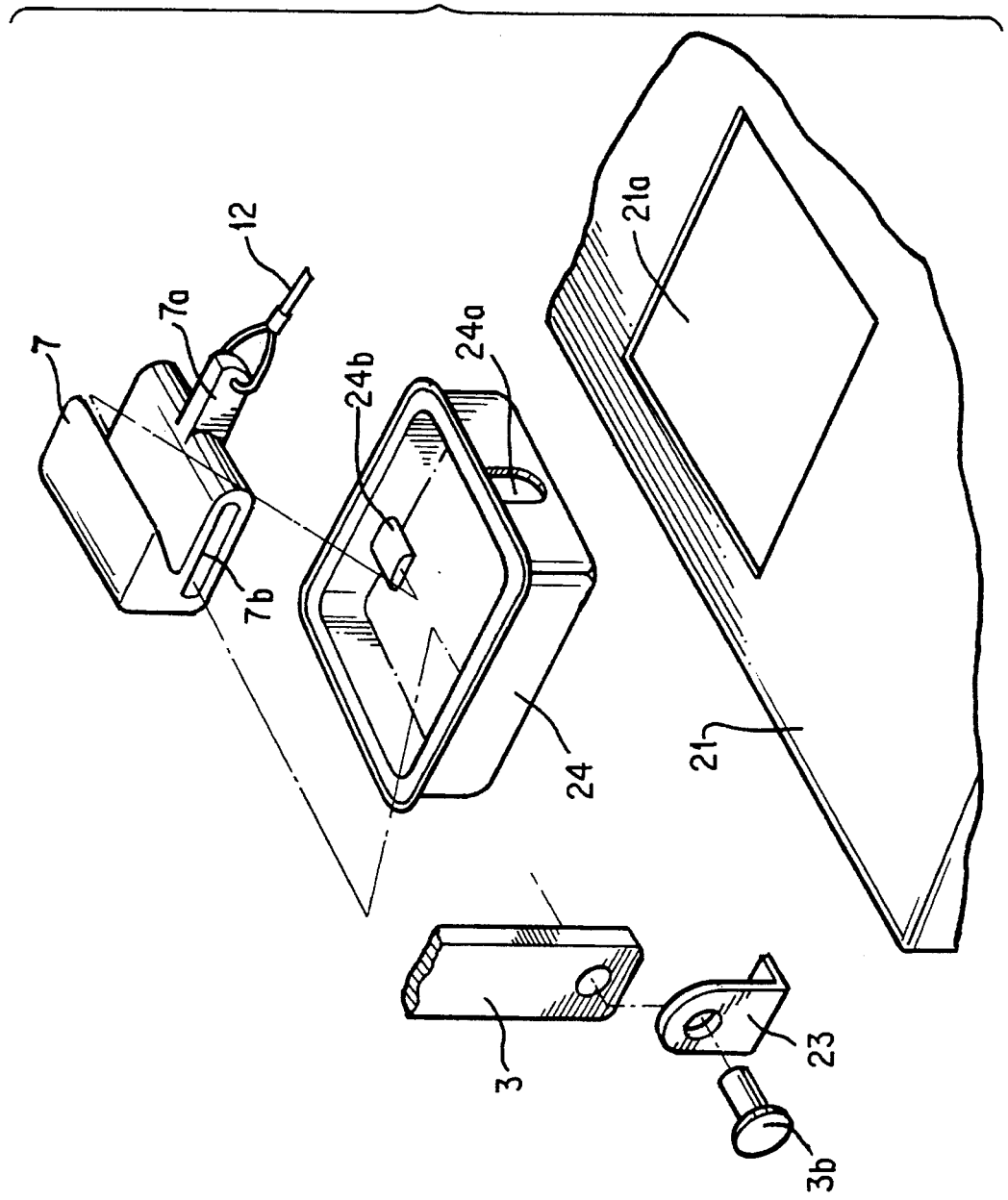
FIG. 3 is a perspective exploded view of a handle of the seat apparatus shown in FIG. 1.
Figure 4:
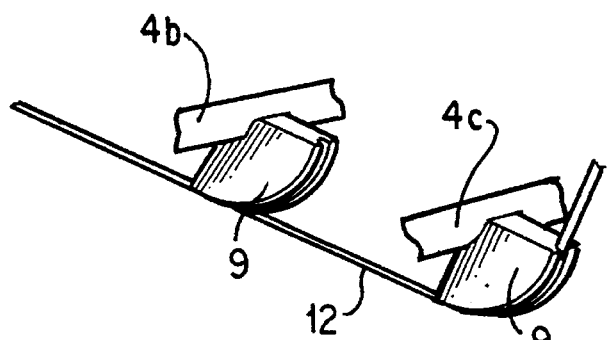
FIG. 4 is a perspective view showing how a wire is guided.

As shown in FIGS. 2–4, at a front portion of the seat-cushion 21, there is formed a rectangular aperture 21a into which a box-shaped garnish 24 is fitted. The handle 7 is accommodated in the garnish 24 and is movable in the longitudinal direction of the seat-cushion 22. The handle 7 is provided with a projection 7a which extends into the seat-cushion 22 through a hole 24a at a rear portion of the garnish 24. A wire 12, which runs within the seat-cushion 21 and the seat-back 22, connects the projection 7a to the pawl. The support of the handle 7 in the garnish 24 is established by a sliding engagement of a slot 7b formed in the handle 7 with a pair of inward projections 24b and 24b (only one is shown) formed integrally with the garnish 24. The guidance of the wire 8 within the seat-cushion 21 and the seat-back 22 can be established by shoes 9 and 9 which are secured to the pins 4b and 4c, respectively.

Figure 5:
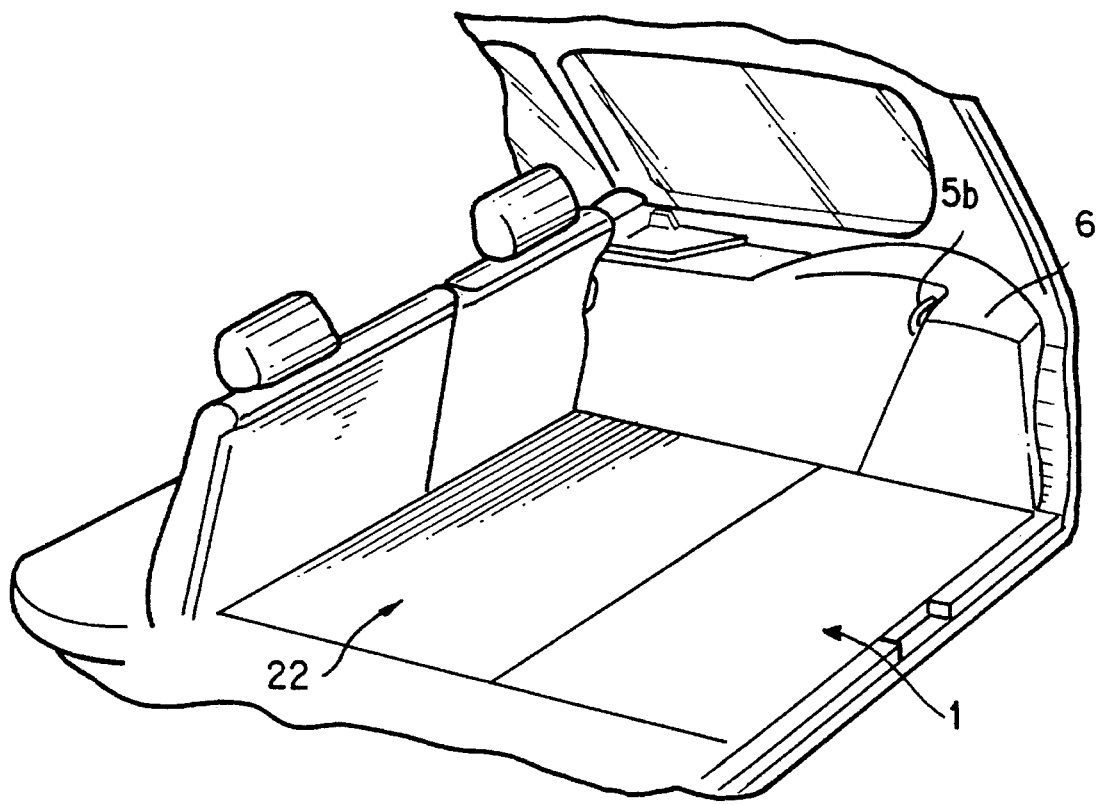
FIG. 5 is a perspective view of a seat apparatus for a vehicle in accordance with a first embodiment of the present invention wherein the seat apparatus is in a non-use position.
Figure 6:
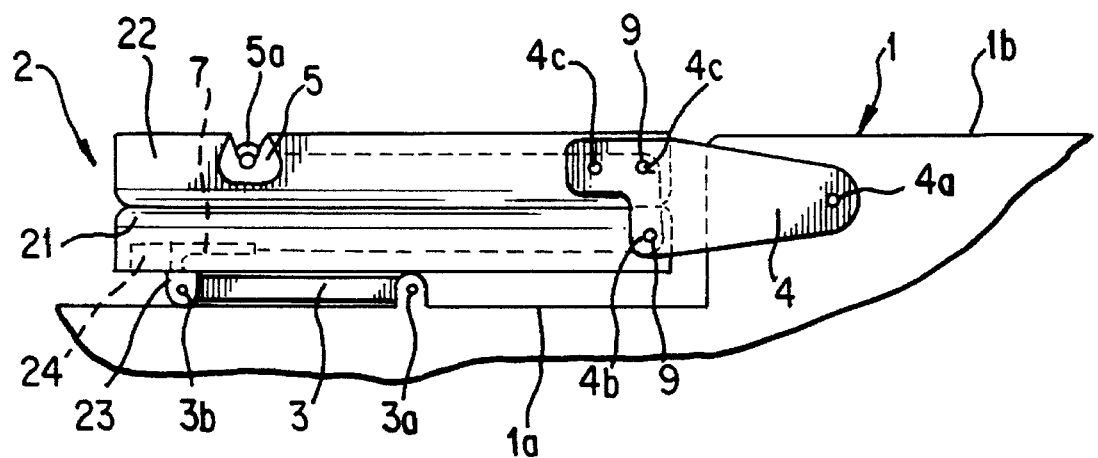
FIG. 6 is a side view of the seat apparatus shown in FIG. 5.
Figure 7:
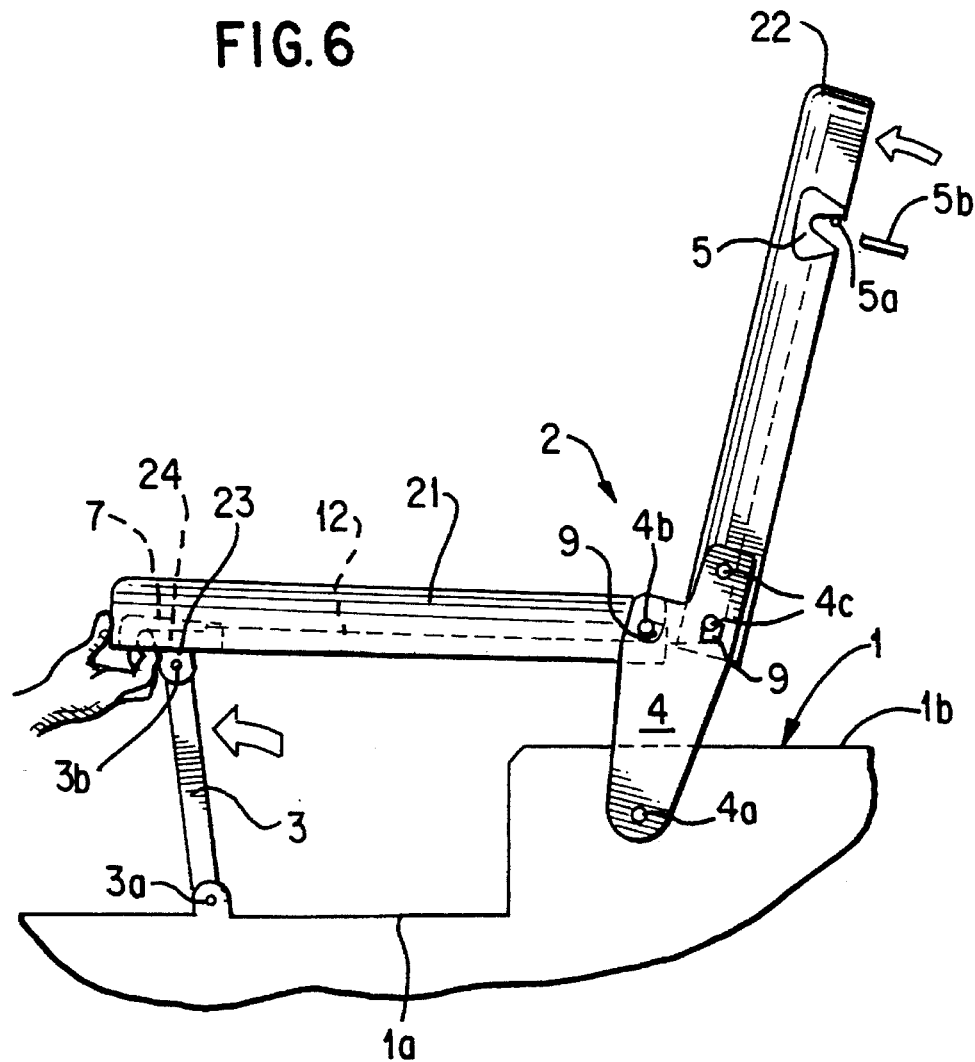
FIG. 7 is a side view showing an operation of the seat apparatus shown in FIG. 1.

In operation, as shown in FIG. 7, when the handle 7 is moved in the frontward direction, the resulting movement of the wire 12 brings the locking mechanism 5 into the unlocked condition in which the seat-cushion 21 and the seat-back 22 are released from the floor 1 and the trim 6, respectively. Further movement of the handle 7 establishes a further frontward movement of the seat-cushion 21 and a counterclockwise rotation of the seat-back 22. As shown in FIGS. 5 and 6, the seat-back 22 is layered with the seat-cushion 21 and coplanar with the higher portion 1b of the floor 1 after the movement.

On the other hand, when the seat-back 22 is rotated in the clockwise direction from the retracted condition shown in FIG. 6 the use condition shown in FIG. 2 can be established without handling the handle 7.

As mentioned above, when the locking mechanism 5 is in its locked condition, the positions of the seat-cushion 21 and the seat-back 22 are kept relative to the floor 1 and the trim 6, respectively. The operation for bringing the locking mechanism 5 into its unlocked condition establishes an automatic transfer of the seat 2 from its use condition to its retracted condition.

Next, a second embodiment of the present invention is explained hereinafter.

Figure 8:
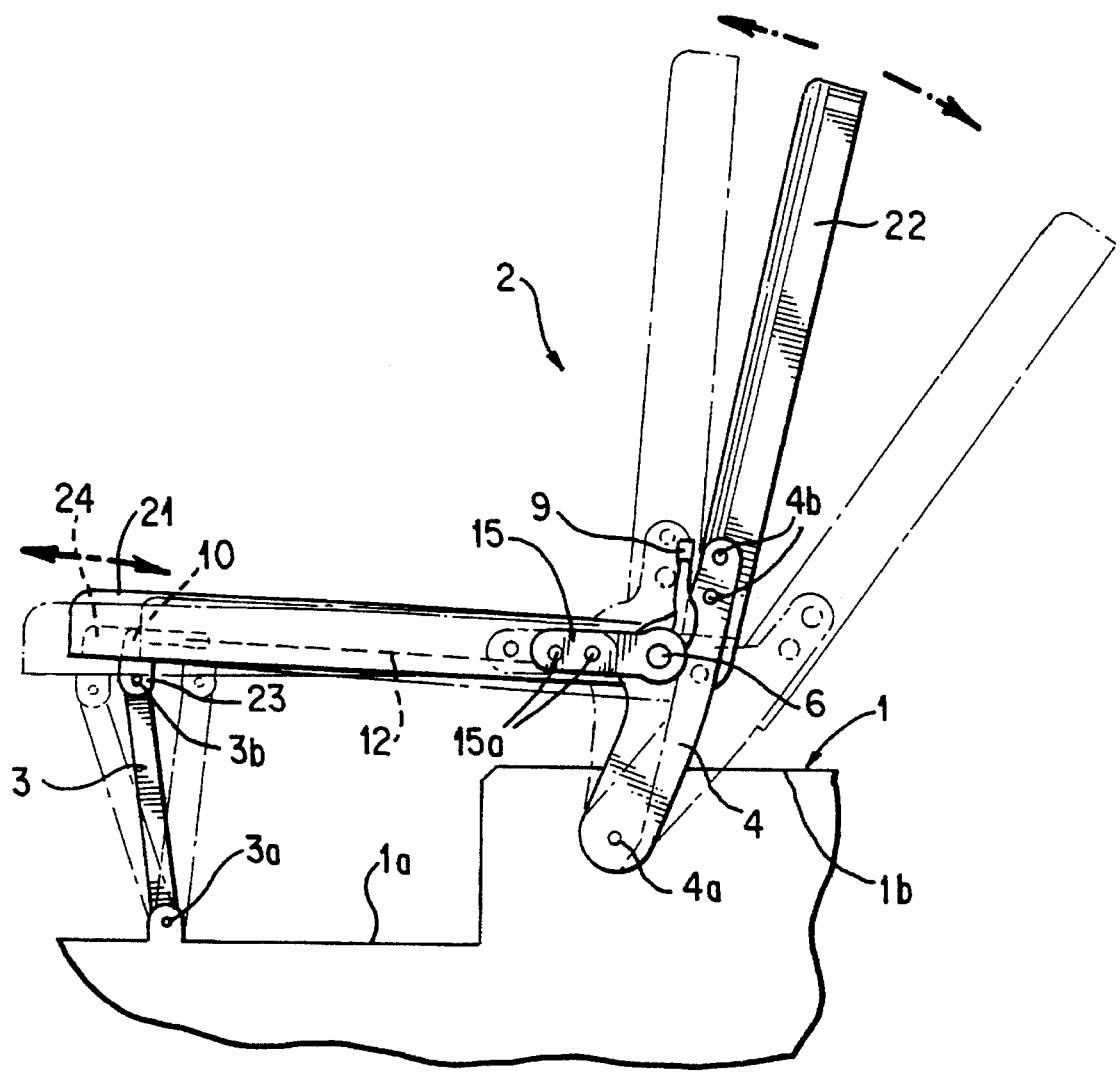
FIG. 8 is a side view of a seat apparatus for a vehicle in accordance with a second embodiment of the present invention wherein the seat apparatus is in a use position.

Referring first to FIG. 8, a stepped floor 1 of a trunk room of a van-type vehicle having an opening and closing rear door (not shown) is depicted. The stepped floor 1 is provided or mounted with a seat 2 having a seat-cushion 21 and a seat-back 22.

A pair of laterally spaced stays 3 and 3 (only one is shown) are pivoted to the lower portion 1a of the floor 1 via pins 3a and 3a (only one is shown). In addition a pair of laterally spaced links 4 and 4 (only one is shown) are pivoted to the higher portion 1b of the floor 1 via pins 4a and 4a (only one is shown). The stay 3 is pivoted to a bracket 23 secured to a lower frontward portion of the seat-cushion 21. The link 4 is supported by a pin 4b to a rear portion of a lateral side of the seat-cushion 21. The link 4 is fixedly connected to a lower end portion of the seat-back 22. At a rearward portion of the seat-cushion 21, an arm 15 is secured via pins 15a. The arm 15 is connected to the link 4 via a shaft 6.

Figure 9:
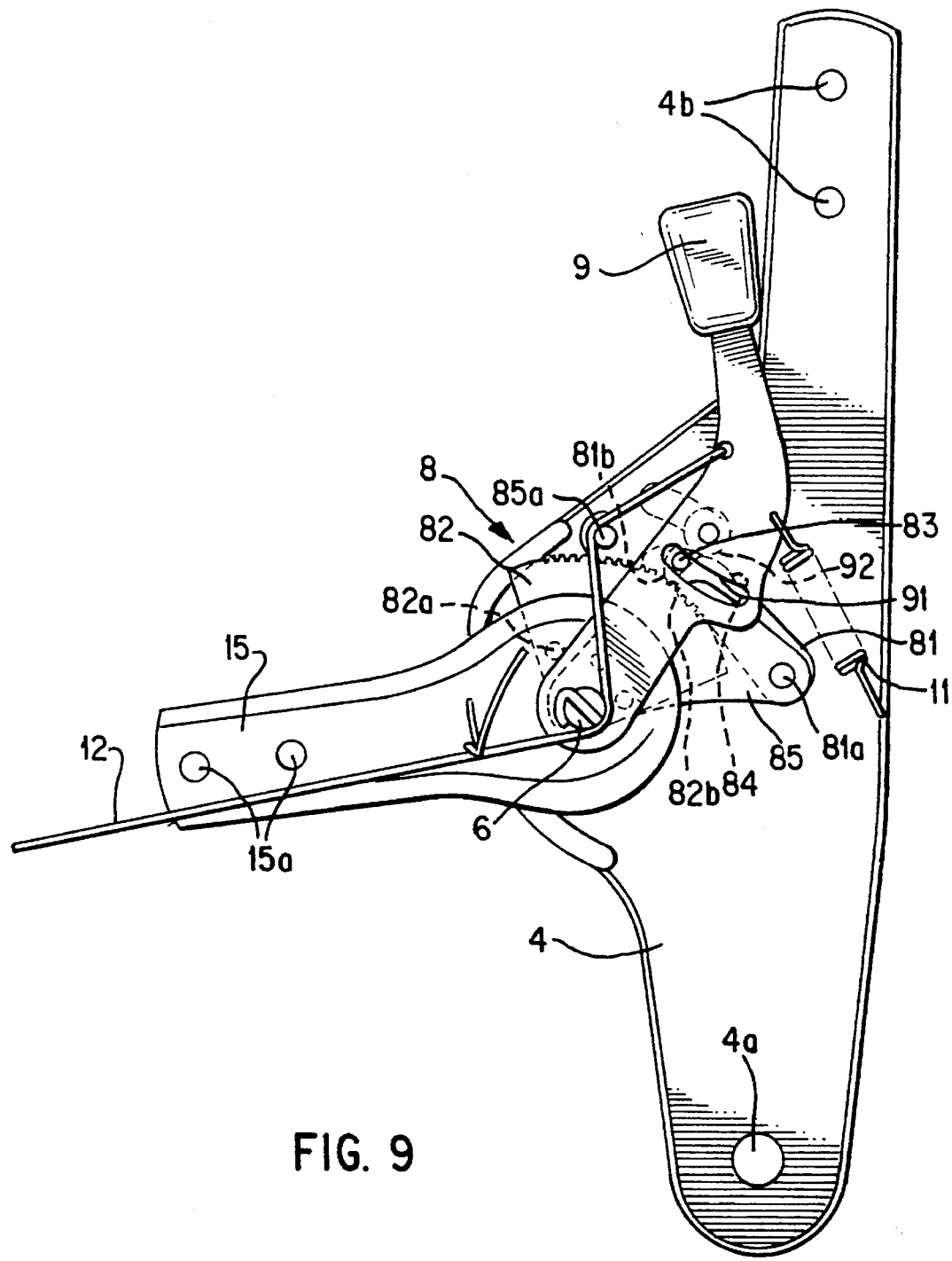
FIG. 9 is a side view of a principal portion of the seat apparatus shown in FIG. 8.

As seen in FIG. 9, the arm 15 is rotatably mounted on the shaft 6 which is secured to the link 4, thereby establishing an operative connection between the arm 15 and the link 4. Between the arm 15 and the link 4, a locking mechanism 8 is provided which includes a pawl 81 and a ratchet 82. The pawl 81 is rotatably mounted on the link 4 via a pin 81a, and the ratchet 82, which is mounted on the shaft 6, is supported by the arm 15 via a projection 82a. The pawl 81 and the ratchet 82 are provided with a geared portion 81b and a geared portion 82b, respectively, both of which are in meshing engagement with each other. This meshing engagement serves for establishing a locking condition under which the link 4 is in fixed connection with the arm 15. The release of the geared portion 81b from the geared portion 82b permits a movement of the arm 15 relative to the link 4.

A handle 10 is operatively connected to the pawl 81 via a lever 9, and operation of either the handle 10 or the lever 9 releases the pawl 81 from the ratchet 82. A cover plate 85 secured to the link 4 by pins 81a and 85a protects a portion at which the pawl 81 is engaged with the ratchet 82.

The lever 9 is rotatably mounted on the shaft 6. The lever 9 has a cam slot 91 with which a pin 83 secured to the pawl 81 is in sliding engagement and a roller 92 engageable with a back side 84 of the pawl 81. Rotation of the lever 9 establishes an engagement between the roller 92 and the back side 84 of the pawl 81, thereby engaging the pawl 81 with the ratchet 82. Rotation of the lever 9 in the reverse direction establishes a release of the roller 92 from the back side 84 of the pawl 81 and a cam action of the cam slot 91 relative to the pin 83 rotates the pawl 81 from the ratchet 82 which results in a disengagement therebetween. A spring 11 is disposed between the lever 9 and the link 4 to ensure the continual engagement between the roller 92 and the back side 84 of the pawl 81.

Figure 10:
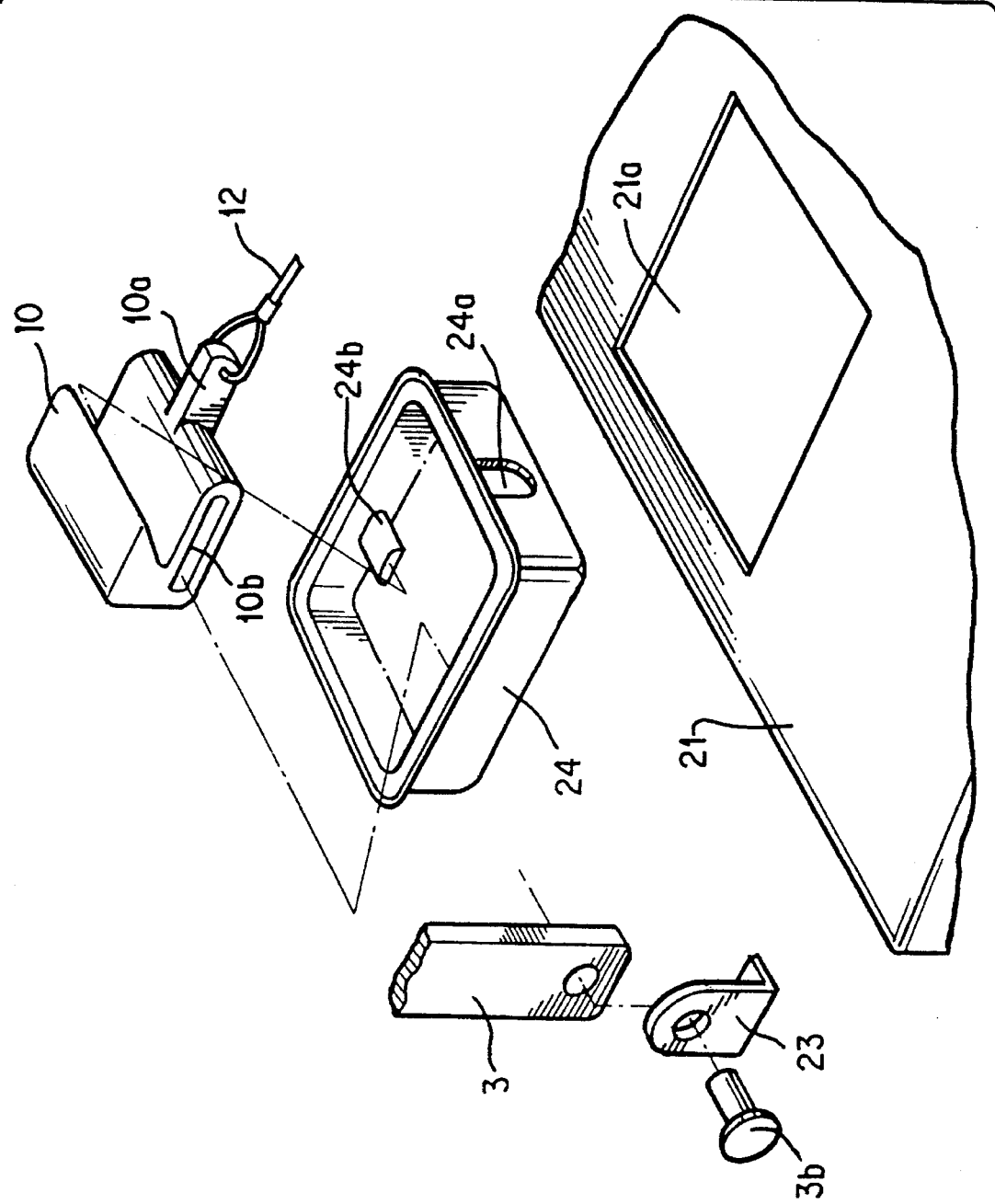
FIG. 10 is a perspective exploded view of a handle of the seat apparatus shown in FIG. 8.

As best shown in FIGS. 8 and 10, at a front portion of the seat-cushion 21, there is formed a rectangular aperture 21a into which a box-shaped garnish is fitted. The handle 10 is accommodated in the garnish 24 and is movable in the longitudinal direction of the seat-cushion 22. The handle 10 is provided with a projection 10a which extends into the seat-cushion 22 through a hole 24a at a rear portion of the garnish 24. A wire 12, which runs within the seat-cushion 21 and the seat-back 22, serves for connecting the projection 10a to the pawl 81 of the link mechanism 8. The support of the handle 10 in the garnish 24 is established by a sliding engagement of a slot 10b formed in the handle 10 with a pair of inward projections 24b and 24b (only one is shown) formed integrally with the garnish 24. The guidance of the wire 12 within the seat-cushion 21 and the seat-back 22 can be established by the shaft 6 and the pin 85a.

In operation, when the lever 9 is rotated in the clockwise (counterclockwise) direction against the biasing force of the spring 11, the roller 92 is released from the back side 84 of the pawl 81 and a cam action of the cam slot 91 relative to the pin 83 rotates the pawl 81 from the ratchet 82 which results in a disengagement therebetween. Thus, the movement of the link 4 relative to the arm 15 becomes possible. In this condition, the reclining angle between the seat-cushion 21 and the seat-back 22 can be adjusted by rotating the seat-back 22 through an angle about the pin 4a, until the lever 9 is released after this rotational operation is terminated or stopped. Clockwise (counterclockwise) rotation of the seat-back 22 increases (decreases) the reclining angle. The resultant reclining angle can be held, because the return movement of the lever 9 by the spring 11 makes the roller 92 engage with the back side 84 of the pawl 81 which leads to the re-engagement between the pawl 81 and the ratchet 82. During the clockwise (counterclockwise) rotation of the seat-back 22, the seat-cushion 21 moves in the rightward (leftward) direction as best shown in FIG. 8. Such a movement of the seat-cushion 21 is established due to pivotal connections of the stay 3 to the seat-cushion 21 and the lower portion 1a of the floor 1. Thus, the passenger or crew on the seat 2 can be in a relaxed attitude.

Figure 11:
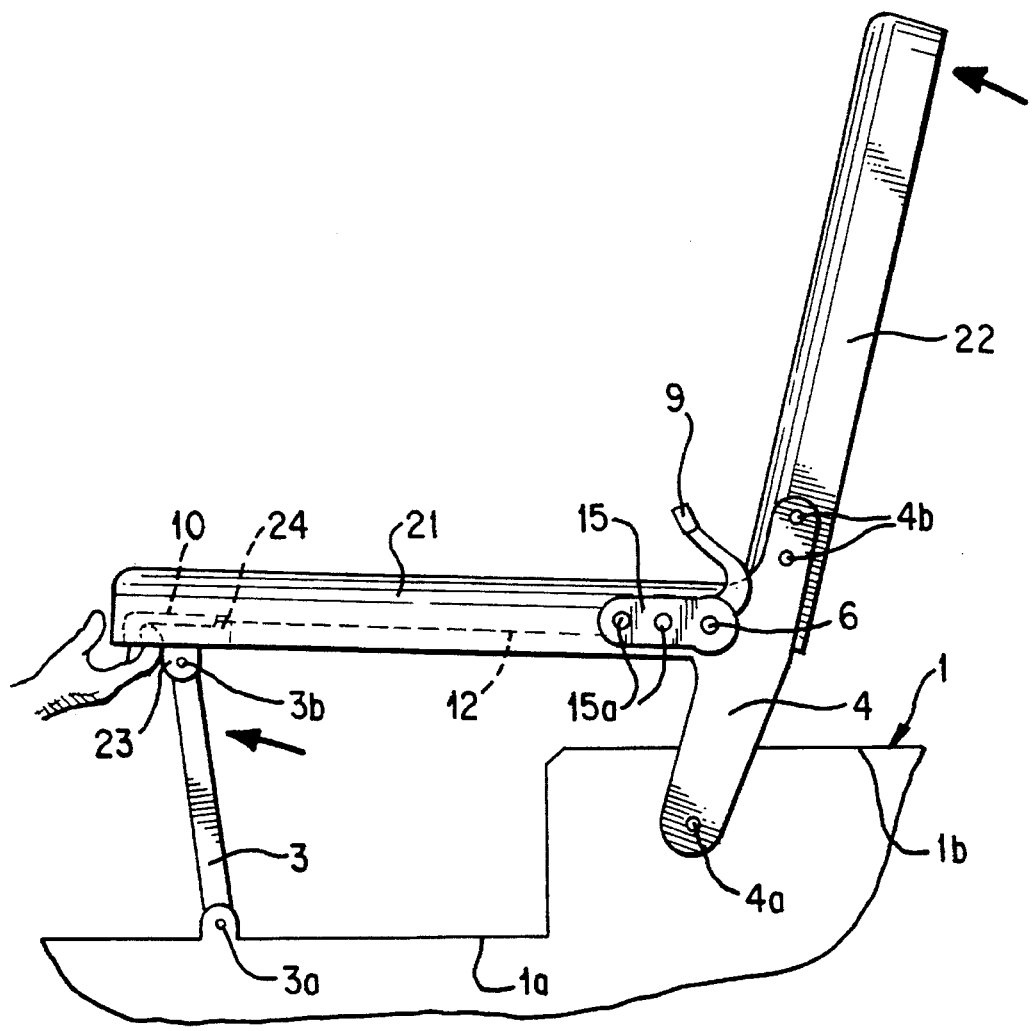
FIG. 11 is a side view showing an operation of the seat apparatus shown in FIG. 8.
Figure 12:
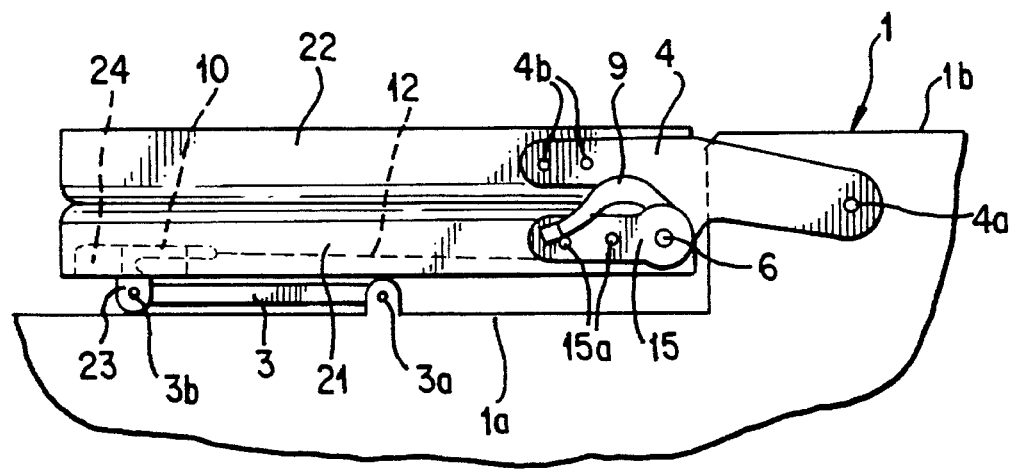
FIG. 12 is a perspective view of a seat apparatus for a vehicle in accordance with a second embodiment of the present invention wherein the seat apparatus is in a non-use position.

As shown in FIG. 11, when the handle 10 is moved in the leftward direction or the frontward direction of the vehicle, the lever 9 which is connected to the handle 10 via the wire 12 is rotated, thereby releasing the pawl 81 from the ratchet 82. Thus, the rotation of the link 4 relative to the arm 15 becomes possible. In this condition, if the handle 10 is moved further in the leftward direction, the resultant movement of the seat-cushion 21 rotates the stay 3 about the pin 3a and rotates the link 4 about the pin 4a, whereby seat-cushion 21 and the seat-back 22 are moved concurrently such that the angle therebetween is decreased. Thus, eventually, as shown in FIG. 12, the seat-back 22 is brought into a layered structure on the seat-cushion 21. Under this condition or non-use position of the seat 2, the seat-back 22 is in line with the higher surface 1b of the floor 1. The transfer of the seat 2 from its use position to the non-use position can be established, in a single action, by moving the handle 10 in the vehicle frontward direction.

In order to bring the seat 2 from its non-use position to it's use position, the seat-cushion 21 should be rotated in a direction opposite to the above rotation after releasing the pawl 81 from the ratchet 82 by manipulating the handle 10.

It should be apparent to one skilled in the art that the above-described embodiment is merely illustrative of but a few of the many possible specific embodiments of the present invention. Numerous and various other arrangements can be readily devised by those skilled in the art without departing from the spirit and scope of the invention as defined in the following claims.

What is claimed is:

1. A seat apparatus for a vehicle comprising:
   a first bracket having an upper end and a lower end for pivoting to a floor of the vehicle;
   a second bracket, located behind the first bracket when the seat apparatus is placed in the vehicle, the second bracket having an upper end and a lower end for pivoting to the floor of the vehicle;
   a seat-cushion having a front end pivotally connected to the upper end of the first bracket and a rear end connected to the upper end of the second bracket so as to be movable relative thereto;
   a seat-back having a lower end connected fixedly to the upper end of the second bracket, the seat-back forming a reclining angle relative to the seat-cushion;
   a locking mechanism having a locking condition in which the reclining angle is held and an unlocking position in which the seat-back is rotatable relative to the seat-cushion; and
   operating means for establishing the unlocking position of the locking mechanism in concurrence with a rotation of the seat-back toward the seat-cushion in a vehicle frontward direction movement, the operating means including a handle having a vehicle frontward direction movement and a wire disposed between the handle and the locking mechanism such that when the wire is moved in the vehicle frontward direction the locking mechanism is placed in the unlocking position.

2. A seat apparatus for a vehicle comprising:
   a first bracket having an upper end and a lower end for pivoting to a floor of the vehicle;
   a second bracket, located behind the first bracket when the seat apparatus is placed in the vehicle, the second bracket having an upper end and a lower end for pivoting to the floor of the vehicle;
   a seat-cushion having a front end pivotally connected to the upper end of the first bracket and a rear end connected to the upper end of the second bracket so as to be movable relative thereto;
   a seat-back having a lower end connected fixedly to the upper end of the second bracket, the seat-back forming a reclining angle relative to the seat-cushion;
   a locking mechanism having a locking condition in which the reclining angle is held and an unlocking position in which the seat-back is rotatable relative to the seat-cushion, the locking mechanism being interposed between the second bracket and the rear end of the seat-cushion and including a ratchet, a pawl in meshing engagement with the ratchet, a lever connected to the pawl so as to be rotatable therewith in unison, and a spring for establishing the meshing engagement between the ratchet and the pawl; and
   operating means for establishing the unlocking position of the locking mechanism in concurrence with a rotation of the seat-back toward the seat-cushion in a vehicle frontward direction movement, the operating means including a handle having a vehicle frontward direction movement and a wire disposed between the handle and the lever such that when the wire is moved in the vehicle frontward direction the pawl is released from the ratchet.

3. A seat apparatus for a vehicle comprising:
   a first bracket having an upper end and a lower end for pivoting to a floor of the vehicle;
   a second bracket, located behind the first bracket when the seat apparatus is placed in the vehicle, the second bracket having an upper end and a lower end for pivoting to the floor of the vehicle;
   a seat-cushion having a front end pivotally connected to the upper end of the first bracket and a rear end connected to the upper end of the second bracket so as to be movable relative thereto;
   a seat-back having a lower end connected fixedly to the upper end of the second bracket, the seat-back forming a reclining angle relative to the seat-cushion;
   a locking mechanism having a locking condition in which the reclining angle is held and an unlocking position in which the seat-back is rotatable relative to the seat-cushion, the locking mechanism being interposed between the second bracket and the rear end of the seat-cushion and including a ratchet and a pawl in meshing engagement with each other; and
   operating means for establishing the unlocking position of the locking mechanism in concurrence with a rotation of the seat-back toward the seat-cushion in a vehicle frontward direction movement, the operating means including a handle having a vehicle frontward direction movement and a wire disposed between the handle and the pawl such that when the wire is moved in the vehicle frontward direction the pawl is released from the ratchet.

* * * * *